(12) United States Patent
Wu

(10) Patent No.: US 7,624,377 B2
(45) Date of Patent: Nov. 24, 2009

(54) METHODS RELATING TO CONFIGURATION OF SOFTWARE

(75) Inventor: Yuh-Cherng Wu, San Jose, CA (US)

(73) Assignee: SAP AG, Walldorf (DE)

( * ) Notice: Subject to any disclaimer, the term of this patent is extended or adjusted under 35 U.S.C. 154(b) by 900 days.

(21) Appl. No.: 11/028,261

(22) Filed: Jan. 4, 2005

(65) Prior Publication Data

US 2006/0155909 A1    Jul. 13, 2006

(51) Int. Cl.
*G06F 9/44* (2006.01)
*G06N 5/00* (2006.01)

(52) U.S. Cl. .................... 717/121; 706/45; 713/100; 717/168

(58) Field of Classification Search ................ None
See application file for complete search history.

(56) References Cited

U.S. PATENT DOCUMENTS

| | | | |
|---|---|---|---|
| 5,428,791 A | | 6/1995 | Andrew et al. |
| 5,664,093 A | | 9/1997 | Barnett et al. |
| 5,748,880 A | | 5/1998 | Ito et al. |
| 6,161,176 A | * | 12/2000 | Hunter et al. ............ 713/1 |
| 6,185,583 B1 | | 2/2001 | Blando |
| 6,266,811 B1 | | 7/2001 | Nabahi |
| 7,051,243 B2 | * | 5/2006 | Helgren et al. ........... 714/48 |
| 7,302,562 B1 | | 11/2007 | Jacobson et al. |
| 7,350,207 B2 | | 3/2008 | Fisher |
| 7,389,444 B2 | * | 6/2008 | Ma et al. .................. 714/26 |
| 2005/0188268 A1 | * | 8/2005 | Verbowski et al. ........ 714/37 |
| 2006/1015589 | | 7/2006 | Wu |

OTHER PUBLICATIONS

Screen shots of a Wizard Builder sold by SAP AG, 7 sheets.
Symantec, "Norton AntiVirus™ 2005" Obtained from the Internet on Oct. 11, 2004 at http://www.symantecstore.com/dr/sat2/Ec_Main.entry24?SP=10023&PN=1&V1=641220&xid=27674&search_id=501753037&doc_id=1&DSP=&CUR=840&PGRP=0&CACHE_ID=0, 2 pages.

* cited by examiner

*Primary Examiner*—Michael J. Yigdall
(74) *Attorney, Agent, or Firm*—Mintz, Levin, Cohn, Ferris, Glovsky and Popeo, P.C.

(57) ABSTRACT

A method relating to configuration of software includes receiving a request sent from a sender computer system to a recipient computer system. The sender computer system including software that has an unsuccessful configuration. The sender computer system is requesting the recipient computer system to provide a new configuration for the software. In the recipient computer system and upon receiving the request, there is identified a previously recorded unsuccessful configuration that was successfully replaced by a successful configuration. The previously recorded unsuccessful configuration is identified using the unsuccessful configuration. The successful configuration is provided from the recipient computer system to the sender computer system. Another method includes receiving several configurations from several sender computer systems. The configurations are stored in the recipient computer system. The stored configurations may be used as a configuration case base for making recommendations.

11 Claims, 4 Drawing Sheets

METHODS RELATING TO CONFIGURATION OF SOFTWARE

TECHNICAL FIELD

This description concerns methods that relate to configuration of software.

BACKGROUND

Some software programs are designed so that a user can configure the software. That is, the user can select one of several configurations to be used in initiating the software, and the selected configuration determines the software's behavior. For example, configurable software programs (or "drivers") typically control the operations of a mouse or a printer connected to a personal computer.

Sometimes, the software includes several parameters that affect software operation and these parameters may be settable in the configuration. The user may select one or more values for any of the parameters, perhaps in lieu of default values. The selected values associated with their respective parameters then constitute the user's configuration for the software. The user may select values for fewer than all of the parameters that are available for configuration.

In larger software systems, such as those that control enterprise-wide operations, it may be desirable or necessary to allow extensive configuration. The configuration is usually created by a system administrator of the organization that is to use the system (the "customer"). Different customers may have very different needs and circumstances and, as a result, may require significantly different configurations of the software. The extensive configuration capacity adds complexity to the development and testing of the software. Moreover, the customers sometime run into problems when selecting a configuration that has not been sufficiently tested, because such a configuration may be deficient or unsuccessful. Moreover, when another customer using the same software has identified a solution to the problems that the customer is experiencing, existing systems do not provide convenient sharing of this knowledge such that past experiences can be used in overcoming future problems.

SUMMARY

The invention relates to methods relating to configuration of software.

In a first general aspect, a method comprises receiving a request sent from a sender computer system to a recipient computer system. The sender computer system includes software that has an unsuccessful configuration. The sender computer system is requesting the recipient computer system to provide a new configuration for the software. The method comprises identifying, in the recipient computer system and upon receiving the request, a previously recorded unsuccessful configuration that was successfully replaced by a successful configuration. The previously recorded unsuccessful configuration is identified using the unsuccessful configuration. The method comprises providing the successful configuration from the recipient computer system to the sender computer system.

In selected embodiments, several sender systems regularly send their configurations to the recipient system.

Identifying the previously recorded unsuccessful configuration may involve comparing a similarity between the configurations.

The recipient system may use received configurations in providing recommendations to one or more sender system.

In a second general aspect, a method comprises receiving several configurations, each of the configurations being sent from one of several sender computer systems to a recipient computer system upon software being configured in the sender computer system. The method comprises storing the configurations in the recipient computer system.

In selected embodiments, the recipient system can use the configuration in providing a recommendation. The recommendation may be based on at least one unsuccessful configuration that was successfully replaced by a successful configuration.

Advantages of the systems and techniques described herein may include any or all of the following: Providing improved configuration of software; providing sharing of configuration experience between systems using common software; providing improved assistance in case of unsuccessful software configurations; reducing human involvement and maintenance costs by providing an automatic maintenance process for known configuration problems; and providing a configuration case base that can be used in making recommendations to software administrators.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
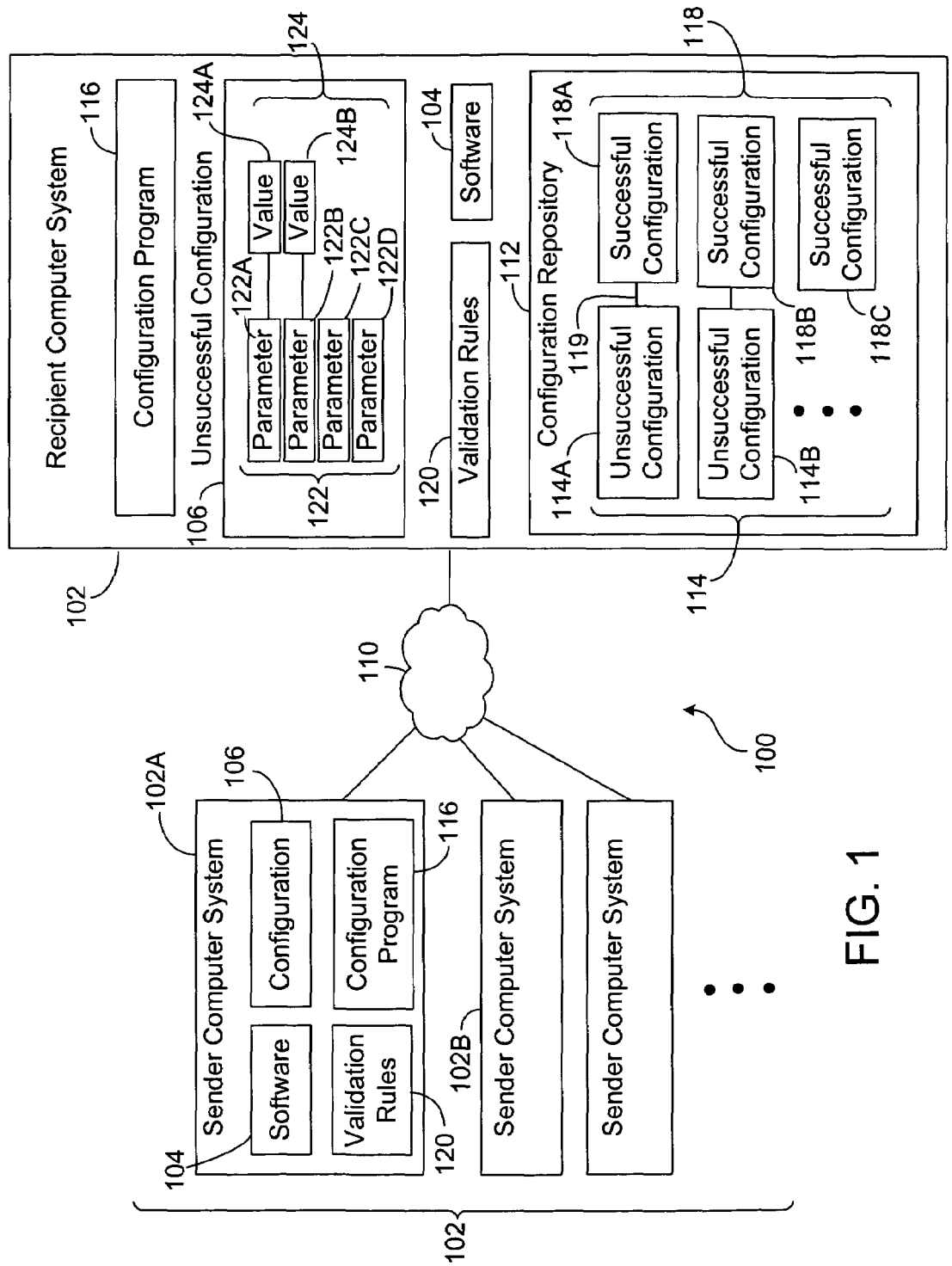
FIG. 1 is a block diagram of a computer system wherein software can be configured.

FIG. 1 is a block diagram of a computer system 100 wherein software can be configured. Particularly, one or more sender computer systems (SCS) 102 each has software 104 stored thereon, which software is created such that a user can specify one or more configurations 106 that control the software's behavior. For example, a user may first install coding for the software 104 on one of the SCS 102 and thereafter initiate a wizard program that in one or more wizard steps lets the user specify the configuration 106 for the software. Each of the SCS 102 may be provided with a unique configuration.

The SCS 102 may be connected to a recipient computer system (RCS) 108 through any kind of network 110. The SCS 102 will send their configurations to the RCS 108, hence the terms "sender" and "recipient". The RCS, in turn, stores the configuration in a configuration repository 112. The RCS can use the configuration repository in providing recommendations to any or all of the SCS.

For example, one of the SCS 102, such as a first SCS 102A, may send to the RCS a first configuration 114A that is unsuccessful in configuring the software 104. The RCS stores the unsuccessful configuration 114A in the repository 112, where it may be one of several unsuccessful configurations 114. The SCS may have labeled the configuration 114A as unsuccessful in the transmission to the RCS. Alternatively, if the SCS provided the configuration 114A to the RCS before the SCS had determined whether the configuration 114A was successful, the SCS can later provide the RCS with updated information indicating that the configuration 114A is unsuccessful.

Typically, there will be some attempt at correcting the configuration to make the software 104 work properly. For example, a user may specify a different configuration and again attempt to initiate the software. Another example is that the RCS upon request can provide a new configuration to the SCS, as will be described later.

In any event, if the SCS obtains a new configuration that is successful in configuring the software, the SCS provides the RCS with the successful configuration. The RCS may include a configuration program 116 that includes executable instructions for sending and receiving configurations, and for comparing configurations, to name a few examples. The program 116 may be provided to each of the SCS, where it can be executed and used in creating, sending and receiving configurations.

Upon receipt of a successful configuration 118A the RCS stores it in the repository 112, where it may be one of several successful configurations 118. Here, the RCS creates an association 119 between the unsuccessful configuration 114A and the successful configuration 118A indicating that the latter successfully replaced the former. From another one of the SCS 102, such as a second SCS 102 B, the RCS may receive, and store in the repository, a second unsuccessful configuration 114B and a second successful configuration 118B that successfully replaced it. One or more successful configurations 118C that was not preceded by any unsuccessful configuration may also be stored in the repository. Accordingly, the repository 112 in the RCS may form a configuration case base where the RCS stores configurations received from one or more SCS, and which case base the RCS can use for different purposes.

The following is one example of using the configuration case base. The first SCS 102A sends a request via the network 110 to the RCS for a new configuration for the software 104. This may occur upon the SCS determining that the configuration 106 is unsuccessful in configuring the software. There may exist validation rules 120 that govern how the user can specify the new configuration, for example in the wizard program described above. The RCS may provide the validation rules 120 to one or more of the several SCS 102. Nevertheless, the user's configuration may be unsuccessful, perhaps because of an unforeseen lack of compatibility in different aspects of the configuration.

Upon receiving the request, the RCS will attempt to find an earlier unsuccessful configuration that has something in common with the current unsuccessful configuration, and use knowledge from the solution to that problem in recommending a new configuration for the present SCS. That is, the SCS may use the current unsuccessful configuration in identifying at least one of the unsuccessful configurations 114 that was successfully replaced by one of the successful configurations 118. The configurations 114 and 118 may have been received from any of the several SCS 102. Thereafter, the RCS can provide the identified successful configuration to the SCS 102A.

Sometimes, the solution to a previous unsuccessful configuration is applicable or useful in correcting another unsuccessful configuration. Thus, identifying the previously recorded unsuccessful configuration may involve determining which of the configurations 114 is most similar to the current unsuccessful configuration. For example, the configuration program 116 contains instructions for comparing the current configuration with one or more of the configurations 114.

In some implementations, the configurations comprise several parameters 122. When the user creates the configuration, some or all of the parameters may be provided with values 124 that specify the characteristics of the configuration. In the unsuccessful configuration 106, some, but not all, of the parameters 122 are provided with values. That is, parameters 122A and B are provided with respective values 124A and B, and parameters 122C and D are not currently provided with user-specified values.

The RCS may perform a comparison of the values. For example, the RCS can determine whether any of the configurations 114 has the values 124A or B provided to the respective parameters 122A or B. If there is not an exact match, the RCS may look for previous configurations with similar values. Thus, identifying the previously recorded unsuccessful configuration to be used may be based on a similarity in the values.

The RCS may perform a comparison of which parameters have been provided with values. That is, the RCS can look for previous configurations that also had values provided to the parameters 122A and B, but had no values provided to the parameters 122C and D. If there is not an exact match, the RCS may look for previous configurations that had a similarity in which parameters are provided with values.

Having identified a previously recorded unsuccessful configuration that was successfully replaced with a successful configuration, the RCS provides the successful configuration to the SCS that requested it. The SCS, in turn, can implement the new configuration. In some implementations, the RCS provides only necessary portions of the successful configuration. For example, it may be sufficient to identify at least one change to be made in the unsuccessful configuration.

If the SCS upon implementation finds the successful configuration 118A to be successful, the SCS may provide this information to the RCS, for example by forwarding the configuration 118A with status "successful". The RCS, in turn, can store this information in the repository 112. Thus, the configuration case base now contains an additional case—the respective unsuccessful and successful configurations used by this specific SCS—which information the RCS subsequently can use to provide recommendations.

Another example of using the configuration case base is to provide a "best practices" type of recommendation. Such a recommendation need not be prompted by any specific problem that one of the SCS is currently experiencing. Rather, it may be provided to give users of the SCS general guidance in choosing successful software configurations. Particularly, the successful configurations 118 can be used to determine common characteristics of successful configurations, which may be useful to share with all of the SCS 102. Accordingly, a "best practices" type of recommendation may be provided based on at least on of the successful configurations.

Figure 2:
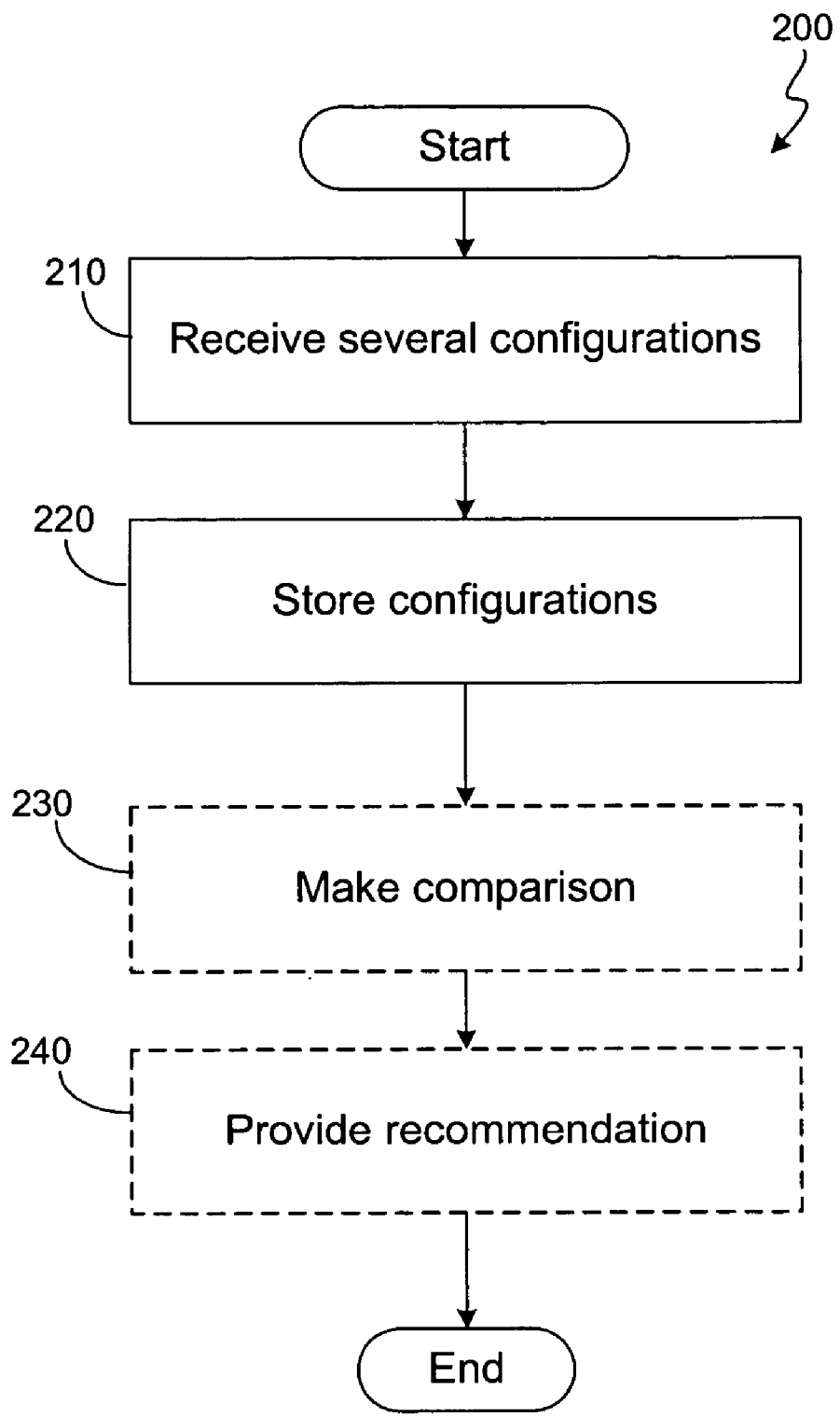
FIGS. 2 and 3 are flow charts of embodiments of inventive methods.

FIG. 2 is a flow chart of a method 200 that relates to configuration of software. The method 200 may be performed in the system 100. For example, a computer program product may include instructions that cause a processor to perform operations comprising the steps of the method 200. As shown in FIG. 2, the method 200 includes the following steps:

Receiving several configurations in step 210. Each of the configurations is sent from one of several sender computer systems to a recipient computer system upon software being configured in the sender computer system. For example, the RCS 108 may receive the configurations 114 and 118 from any of the several SCS 102. The configuration program 116 being executed by the respective SCS may prompt them to send the configurations.

In step 220, storing the configurations in the recipient computer system. For example, the RCS may store the configurations in the configuration repository 112. The RCS may generate the association 119 between an unsuccessful and a successful configuration. The configurations may be stored such that a comparison can be made, for example to determine a similarity in parameter values or in which parameters are provided with values.

Making a comparison in optional step 230. This step may be performed upon receiving a request for a new configuration from a SCS that currently has an unsuccessful configuration. The configuration program 116 may trigger the RCS to determine which of the stored configurations is most similar to the configuration 106, which is a newly received unsuccessful configuration.

Providing the recommendation in optional step 240. For example, the recommendation comprises providing the successful configuration in response to the request from the SCS. As another example, the recommendation comprises "best practices" advice that is based on at least one of the successful configurations 118.

Figure 3:
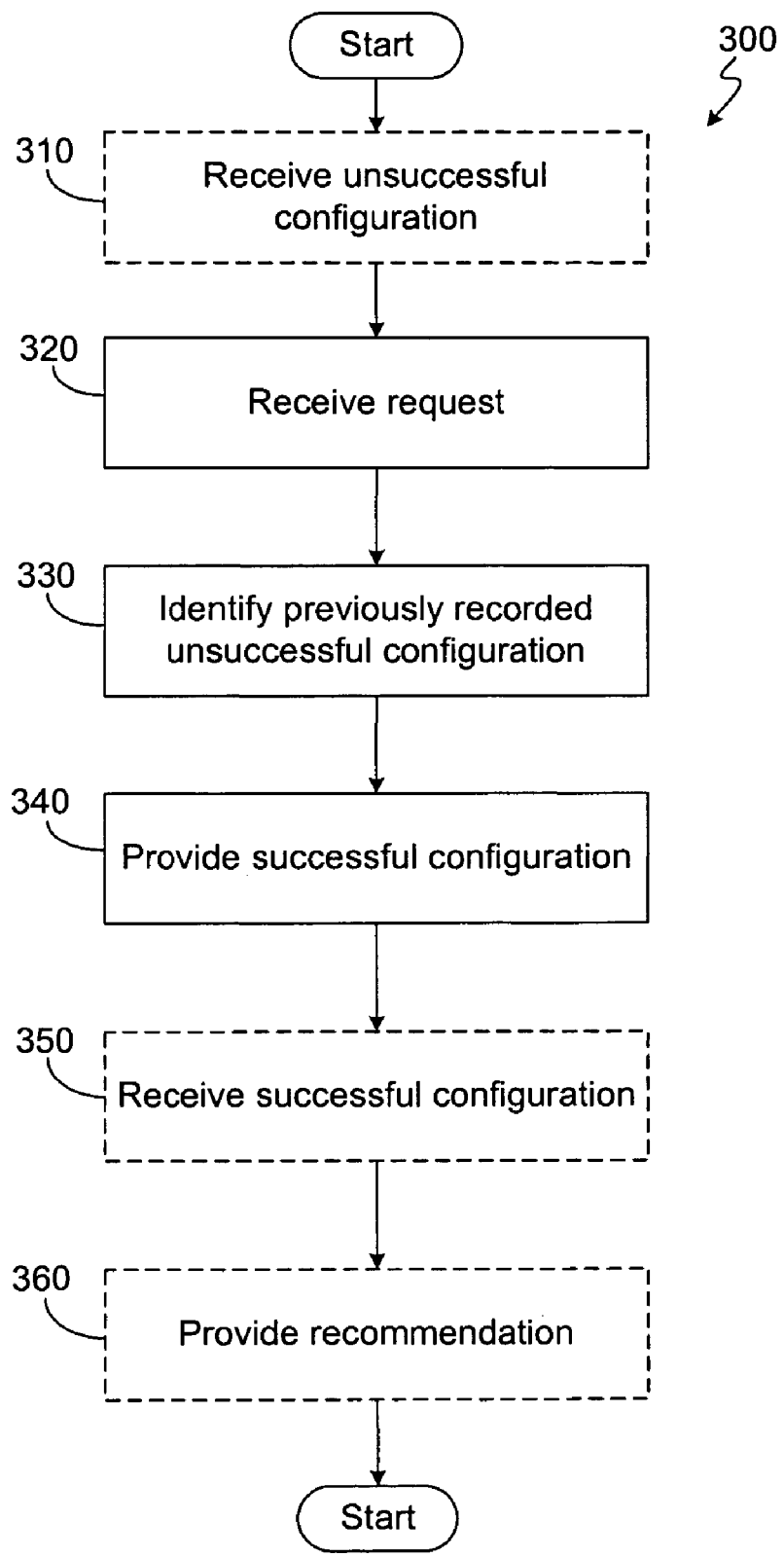

FIG. 3 is a flow chart of a method 300 that relates to configuration of software. The method 300 may be performed in the system 100. For example, a computer program product may include instructions that cause a processor to perform operations comprising the steps of the method 300. As shown in FIG. 3, the method 300 includes the following steps:

Receiving an unsuccessful configuration in optional step 310. The unsuccessful configuration may be sent from any of the several SCS 102. In some implementations, the SCS 102 routinely send their newly created configurations to the RCS, sometimes before the SCS has tested whether the software 104 is successfully configured. Accordingly, while the configuration can optionally be received in this step, its status as "unsuccessful" may be determined later.

Receiving a request sent from a sender computer system to a recipient computer system in step 320. The sender computer system includes software that has an unsuccessful configuration and the sender computer system is requesting the recipient computer system to provide a new configuration for the software. For example, the SCS having the unsuccessful configuration 106 may request the RCS 108 to provide a new configuration for the software. The unsuccessful configuration may be received in connection with receiving the request or it may have been received in optional step 310.

Identifying, in step 330, a previously recorded unsuccessful configuration that was successfully replaced by a successful configuration. The previously recorded unsuccessful configuration is identified, upon receiving the request, in the recipient computer system and using the unsuccessful configuration. The identification may involve a similarity comparison with the unsuccessful configuration, for example using its values or value-provided parameters.

Providing the successful configuration from the recipient computer system to the sender computer system in step 340. For example, the RCS provides the successful configuration 118A through the network 110. Providing the successful configuration may be done by identifying at least one change to be made in the unsuccessful configuration. For example, the RCS identifies differences between the unsuccessful configuration 106 and the successful configuration 118A.

Receiving, in optional step 350, a successful configuration. For example, any of the several SCS 102 provides the successful configuration 118C as part of its routine reporting when the new configuration is created.

Providing a recommendation in optional step 360. The recommendation may be based on the successful configuration received in optional step 350, and may also be based on any other configuration that is available to the RCS. For example, the recommendation is "best practices" advice that has been created by analyzing the successful configurations.

Figure 4:
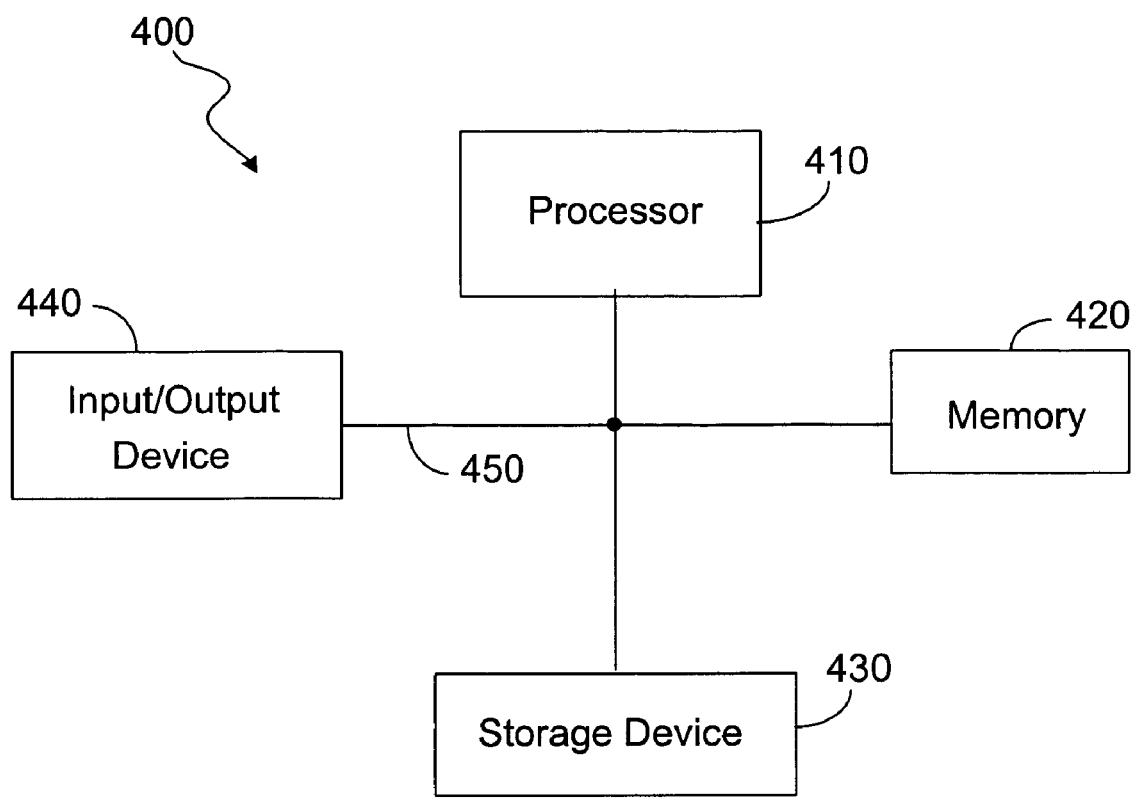
FIG. 4 is a block diagram of a general computer system.

FIG. 4 is a block diagram of a computer system 400 that can be used in the operations described above, according to one embodiment. For example, the system 100 can be included in any or all of the SCS 102 and the RCS 108.

The system 400 includes a processor 410, a memory 420, a storage device 430 and an input/output device 440. Each of the components 410, 420, 430 and 440 are interconnected using a system bus 450. The processor 410 is capable of processing instructions for execution within the system 400. In one embodiment, the processor 410 is a single-threaded processor. In another embodiment, the processor 410 is a multi-threaded processor. The processor 410 is capable of processing instructions stored in the memory 420 or on the storage device 430 to display graphical information for a user interface on the input/output device 440.

The memory 420 stores information within the system 400. In one embodiment, the memory 420 is a computer-readable medium. In one embodiment, the memory 420 is a volatile memory unit. In another embodiment, the memory 420 is a non-volatile memory unit.

The storage device 430 is capable of providing mass storage for the system 400. In one embodiment, the storage device 430 is a computer-readable medium. In various different embodiments, the storage device 430 may be a floppy disk device, a hard disk device, an optical disk device, or a tape device.

The input/output device 440 provides input/output operations for the system 400. In one embodiment, the input/output device 440 includes a keyboard and/or pointing device. In one embodiment, the input/output device 440 includes a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method relating to configuration of software, the method comprising:
   receiving a current software configuration comprising current parameter values from one of a plurality of sender computer systems at a recipient computer system, the recipient computer system comprising a first software configuration that has been previously applied unsuccessfully within the plurality of sender computer systems and a second software configuration that has been previously applied successfully with the plurality of sender computer systems, the first and second software configurations each comprising a plurality of parameters as well as respective first and second values for a subset of the plurality of parameters characterizing the respective first and second software configurations, the sender computer system having sent the current software configuration upon determining that the current software configuration is unsuccessful on the sender computer system;
   comparing, by the recipient computer system, the current parameter values with the first software configuration to identify commonality of the first software configuration with the current software configuration;
   identifying the second software configuration as having been previously applied successfully to replace the first software configuration;
   providing a new software configuration from the recipient computer system to the sender computer system, the new software configuration comprising the second values of the parameters for the second software configuration; and
   receiving confirmation from the sender computer system if the new software configuration is successfully applied on the sender computer system.

2. The method of claim 1, further comprising the recipient computer system receiving the second software configuration from any of the plurality of sender computer systems.

3. The method of claim 1, wherein the recipient computer system receives a request for a new configuration after receiving the current configuration.

4. The method of claim 1, wherein providing the new configuration comprises identifying, to the sender computer system, at least one change to be made in the current configuration.

5. The method of claim 1, further comprising: sending, from the recipient computer system to each of the plurality of sender computer systems, one or more validation rules to be applied by the sender computer system to determine if the current software configuration is unsuccessful.

6. A computer program product tangibly embodied in an information carrier, the computer program product including instructions that, when executed, cause a processor to perform operations comprising:
   receiving a current software configuration comprising current parameter values from one of a plurality of sender computer systems at a recipient computer system, the recipient computer system comprising a first software configuration that has been previously applied unsuccessfully within the plurality of sender computer systems and a second software configuration that has been previously applied successfully with the plurality of sender computer systems, the first and second software configurations each comprising a plurality of parameters as well as respective first and second values for a subset of the plurality of parameters characterizing the respective first and second software configurations, the sender computer system having sent the current software configuration upon determining that the current software configuration is unsuccessful on the sender computer system;
   comparing, by the recipient computer system, the current parameter values with the first software configuration to identify commonality of the first software configuration with the current software configuration;
   identifying the second software configuration as having been previously applied successfully to replace the first software configuration;
   providing a new software configuration from the recipient computer system to the sender computer system, the new software configuration comprising the second values of the parameters for the second software configuration; and
   receiving confirmation from the sender computer system if the new software configuration is successfully applied on the sender computer system.

7. A method relating to configuration of software, the method comprising:
   receiving a plurality of software configurations, each of the plurality of software configurations being sent from one of several sender computer systems to a recipient computer system upon each of the software configurations being applied in the respective sender computer system, the plurality of current software configurations comprising a first software configuration that was unsuccessful and a second software configuration that was successful, the first and second software configurations each comprising a plurality of parameters as well as respective values for a subset of the plurality of parameters that specify characteristics of the respective first and second software configuration;

storing the plurality of software configurations in the recipient computer system; and providing a recommendation to one of the sender computer systems from which a current unsuccessful software configuration is received, the recommendation comprising at least a subset of the parameter values of the second software configuration if the second configuration was found to have successfully replaced the first configuration on another of the several sender computer systems; and receiving confirmation from the sender computer system if the recommendation results in a successful software configuration on the sender computer system.

8. The method of claim 7, wherein the plurality of software configurations are stored in the recipient computer system for comparison between the unsuccessful current software configuration and the plurality of software configurations.

9. The method of claim 8, wherein the newly received unsuccessful current software configuration comprises current parameters for configuring the software, and wherein at least some of the current parameters are provided with current values in the newly received unsuccessful current software configuration.

10. The method of claim 9, wherein the comparison involves determining a similarity in the current values of the newly received unsuccessful configuration with the stored values of the stored first software configurations.

11. A computer program product tangibly embodied in an information carrier, the computer program product including instructions that, when executed, cause a processor to perform operations comprising:

receiving a plurality of software configurations, each of the plurality of software configurations being sent from one of several sender computer systems to a recipient computer system upon each of the software configurations being applied in the respective sender computer system, the plurality of current software configurations comprising a first software configuration that was unsuccessful and a second software configuration that was successful, the first and second software configurations each comprising a plurality of parameters as well as respective values for a subset of the plurality of parameters that specify characteristics of the respective first and second software configuration;

storing the plurality of software configurations in the recipient computer system; and providing a recommendation to one of the sender computer systems from which a current unsuccessful software configuration is received, the recommendation comprising at least a subset of the parameter values of the second software configuration if the second configuration was found to have successfully replaced the first configuration on another of the several sender computer systems; and receiving confirmation from the sender computer system if the recommendation results in a successful software configuration on the sender computer system.

* * * * *

UNITED STATES PATENT AND TRADEMARK OFFICE
CERTIFICATE OF CORRECTION

PATENT NO.         : 7,624,377 B2                                          Page 1 of 1
APPLICATION NO.    : 11/028261
DATED              : November 24, 2009
INVENTOR(S)        : Yuh-Cherng Wu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1158 days.

Signed and Sealed this

Twenty-sixth Day of October, 2010

David J. Kappos
*Director of the United States Patent and Trademark Office*